Patented Mar. 27, 1951

2,546,912

UNITED STATES PATENT OFFICE 2,546,912

ABSORPTION REFRIGERATOR

Otis B. Sutton, Canton, Ohio, assignor to The Hoover Company, North Canton, Ohio, a corporation of Ohio Application December 6, 1945, Serial No. 633,161

12 Claims. (Cl. 62—119.5)

This application relates to the art of refrigeration and more particularly to refrigerating machines of the type in which energy is applied to the apparatus in the form of heat.

It is a particular object of the present invention to produce electrical energy to operate electrically operated parts of the system, or adjuncts thereto, by utilizing either the waste heat rejected from the primary heating element or a heat rejecting portion of the apparatus or by utilizing a portion of the heat immediately liberated by the primary heating element, as particular conditions may indicate, to generate the required electrical energy to operate the aforesaid elements of the system or adjuncts thereto.

More specifically it is an object of the present invention to circulate the inert gas in a three-fluid absorption refrigerating apparatus by an electrical propulsion device which is energized by current produced in a thermo-electric generator which has its hot junction in position to be heated either by waste heat from the system or by heat derived directly from the primary heating element.

It is a further object of the present invention to produce circulation in a secondary refrigerating circuit associated with a primary refrigerating system by utilizing electrical energy derived from a thermocouple energized directly or indirectly by the heat applied to the primary refrigerating system.

It is a further object of the invention to propel fluids in a primary system and/or an auxiliary refrigerating system by electrical propulsion devices energized through a thermopile activated by heat applied to the apparatus by the heating element for the primary system or by waste heat.

It is a further object of the present invention to provide a refrigerating system of maximum compactness which produces a refrigerating effect which is applied remotely from the refrigerating system through the agency of a secondary system activated by electrical energy developed from heat applied to or rejected from the primary refrigerating system.

It is a further object to provide a compact arrangement of an absorption refrigerating apparatus characterized in that the primary refrigerating system may be housed entirely below and within the projected area of the food storage chamber with the refrigerating effect transferred to the storage chamber by the medium of a secondary refrigerating system activated through heat applied to the primary refrigerating system.

Other and further objects of the invention will become more apparent as the detailed description thereof proceeds in connection with the accompanying drawings in which.

Figure 1:
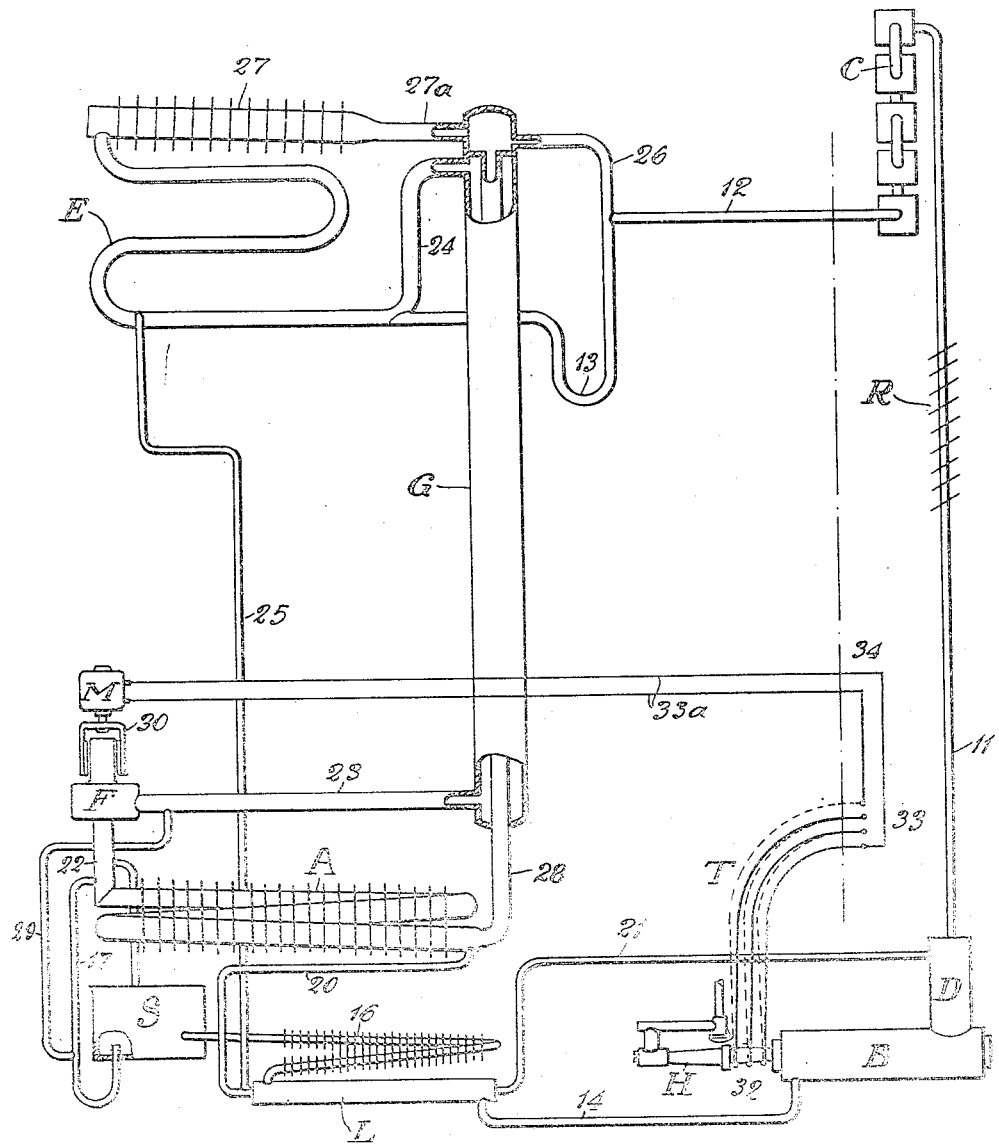
Figure 1 is a schematic representation of a three-fluid refrigerating apparatus embodying the present invention.
Figure 2:
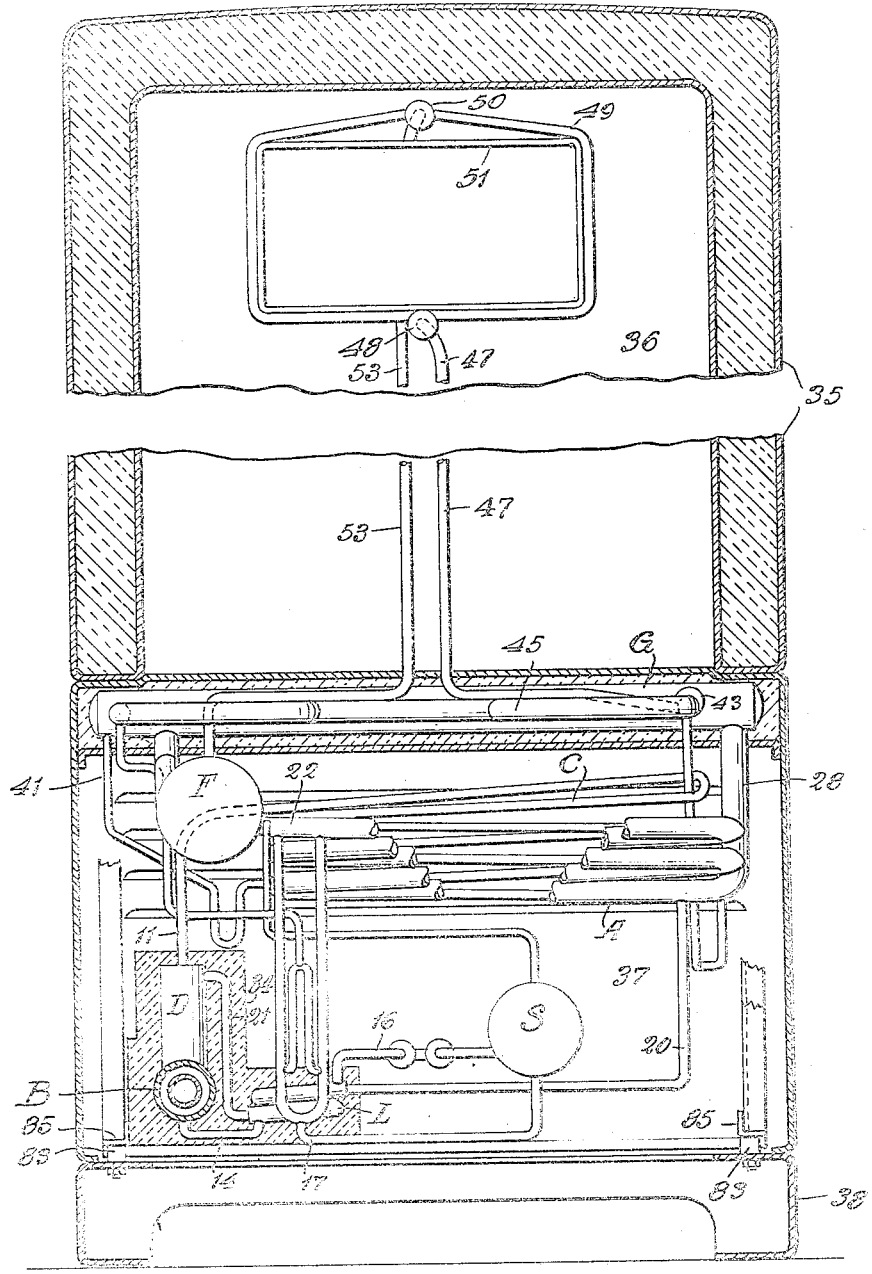
Figure 2 is a front sectional elevational view of one exemplification of the invention applied to a cabinet construction and utilizing a secondary refrigerating system to apply the refrigerating effect to the food storage compartment.

The refrigerating system illustrated in Figure 1 is of the pressure equalized absorption type utilizing an inert gas circulating between the absorber and evaporator which is propelled by a suitable pumping mechanism. The apparatus is charged with a refrigerant such as ammonia, an absorbent therefor such as water and a pressure equalizing medium which is inert with respect to the refrigerant and the absorbent, preferably a dense gas like nitrogen.

The boiler B, which contains a solution of the refrigerant in the absorbent, is heated in any suitable manner as by a combustible fuel burner H. The application of heat to the boiler causes the liberation of refrigerant vapor which passes upwardly through the analyzer D, conduit 11 and rectifier R to the air cooled condenser C where it is liquefied and drains to the bottom of the evaporator E through the conduit 12 and liquid seal trap element 13.

The lean solution formed in the boiler B by the evolution of refrigerant vapor is conveyed therefrom to the upper portion of the tubular air cooled absorber A through conduit 14, liquid heat exchanger L, solution pre-cooler 16, the solution reservoir S and the gas lift pump conduit 17. The solution flows downwardly through the absorber in counter-flow relationship with a mixture of refrigerant vapor and inert gas. The solution absorbs refrigerant vapor from the mixture and the resulting heat of absorption is rejected to the atmospheric air. The enriched solution thus formed in the absorber is returned to the generator assembly by conduit 20, liquid heat exchanger L and conduit 21 which opens into the upper portion of the analyzer D.

The lean inert gas refrigerant vapor mixture formed in the absorber is removed therefrom through conduit 22 to the circulating fan F which places the gas under pressure and discharges the same through conduit 23, the outer pass of gas heat exchanger G and conduit 24 to the bottom portion of the evaporator E wherein it meets the liquid refrigerant supplied through conduits 12 and 13 from condenser C. The evaporator E is herein shown conventionally but is preferably of the type illustrated and described in United States Letters Patent No. 2,328,196 issued August 31, 1943.

The inert gas supplied to the evaporator has sufficient velocity and pressure to cause the liquid refrigerant to flow upwardly through the evaporator as the liquid is evaporating into the gas to produce the refrigerating effect.

The evaporator is provided with a drain 25 to convey excess liquid to the solution conduit 20 sufficiently to prevent flooding of the lower evaporator conduit.

A vent conduit 26 is connected to the inner pass of the gas heat exchanger between the connection of conduits 12 and 13 to purge the condenser of non-condensable products.

Refrigerant and inert gas flow upwardly through the evaporator and flow from the upper finned air cooling section thereof through conduit 27a, gas heat exchanger G and conduit 28 to the absorber A to complete the inert gas circuit.

Pumping gas flows from gas circulator F through conduits 23 and 29 to gas lift pump 17 below the liquid level in reservoir S.

The gas propulsion element F is preferably in the form of a fan driven by a motor M through a magnetic drive 30 in the manner described and claimed in an application of C. G. Puchy, Patent No. 2,386,505 issued October 9, 1945. The motor M is energized by a thermo-electric generator indicated generally at T. The thermo-electric generator comprises a thermopile composed of a plurality of hot junctions 32 positioned to be heated by the flame of the combustible fuel burner H and a plurality of cold junctions 33 which are positioned to be cooled in any suitable manner. The junctions may, for example, consist of one element composed of about 90% nickel and 10% chromium and one element composed of about 50% nickel and 50% copper. As shown, the cold junctions 33 are diagrammatically represented as being positioned in an air flue 34 at the rear of a conventional cabinet construction which normally houses the condenser and provides for cooling air flow over the absorber. Such a cabinet arrangement is illustrated in United States Letters Patent 2,345,505 issued March 28, 1944, to A. D. Siedle. The electrical energy developed by the thermopile is conducted to motor M by conductor wires 33a.

In the operation of the above-described refrigerating system energization of the fuel burner H applies energy in the form of heat to the refrigerating system in the usual manner and also causes an electrical current to be generated in the thermopile T. This electrical current is utilized to actuate the electrical motor M for the gas propulsion fan F and thus serves to produce circulation of the inert gas and of the absorbing solution through the agency of the gas lift pump 17.

Therefore, the above-described system receives energy from an external source only in the form of heat, part of which energy is directly applied to the system in the form of heat and the balance of which is converted to electrical energy to operate an electrically energized fluid circulating device.

The above arrangement is particularly desirable in localities where electrical energy as such is not readily available or if available is present only in forms and under conditions not readily adaptable to the needs of a refrigerating system. This type refrigerating system may be operated effectively whether heated by gas, solid fuel, liquid fuel or by a hot fluid such as steam which may be made available from any suitable source.

One preferred arrangement of utilizing the invention diagrammatically illustrated in Figure 1 is depicted in detail in Figures 2 to 5. In these figures there is illustrated an insulated cabinet structure 35 which comprises an upper food storage compartment 36 and a lower mechanism compartment 37, all supported upon an openwork base frame 38. An insulated closure 39 is provided for the storage compartment 36. The lower insulated wall 40 of the cabinet structure is preferably built as a part of the lower mechanism chamber and base structure for convenience in manufacture. In this arrangement the vertical and top walls of the cabinet structure will be built as one unit and then dropped over the other unit and secured to the insulated wall 40.

The refrigerating system per se illustrated in these figures is essentially the same as that diagrammatically described above in connection with Figure 1 and like parts are therefore given the same reference characters. The relative arrangement of the parts in Figures 2 to 5 is different from that diagrammatically represented in Figure 1.

Figure 4:
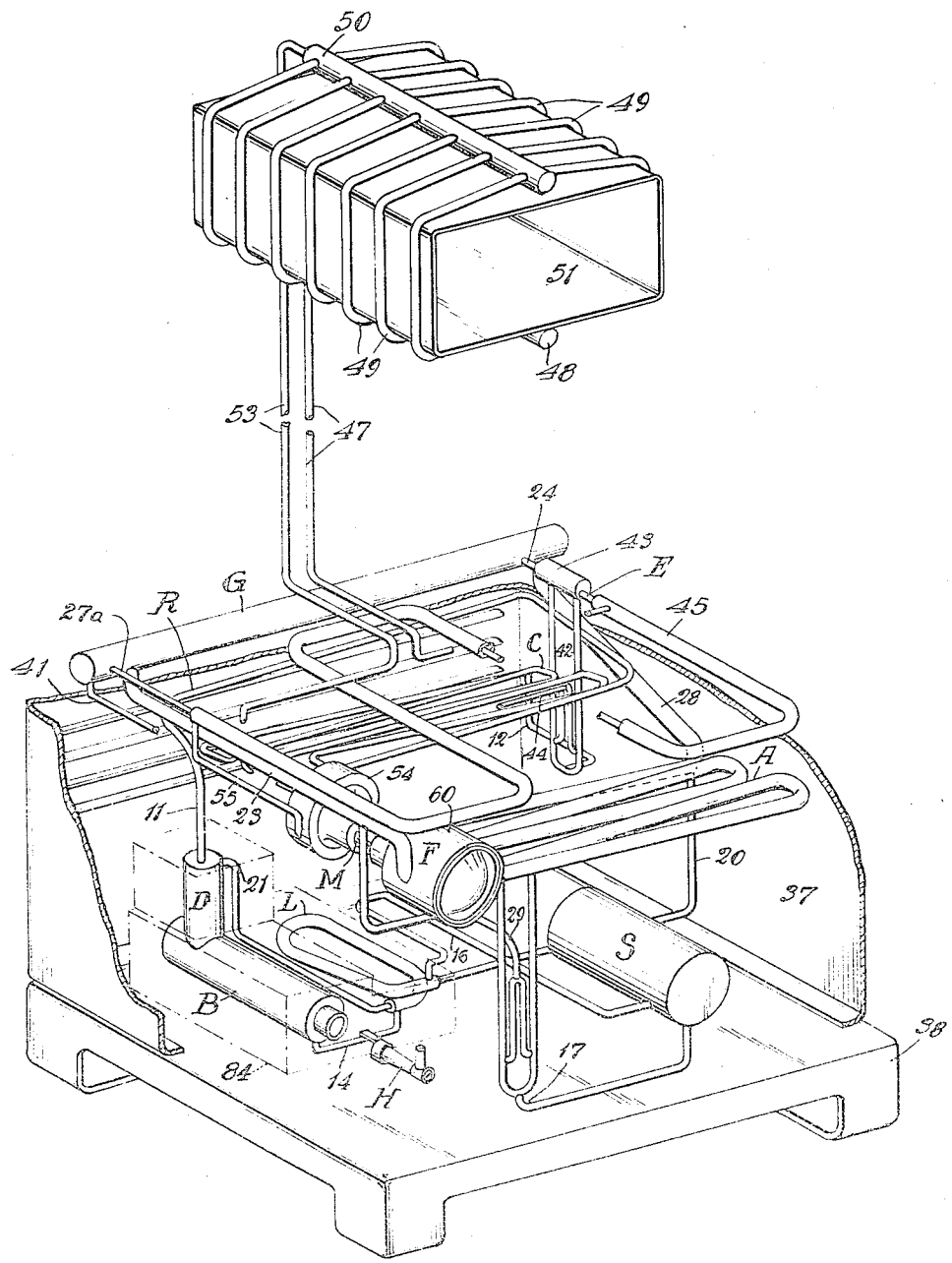
Figure 4 is a partial perspective view of the apparatus shown in Figures 2 and 3 with certain parts omitted and other parts cut away to illustrate the arrangements of the parts and the various connections making up the complete refrigerating apparatus.

The refrigerating system per se is most clearly illustrated in Figure 4 to which reference is now made. In this form of the invention the evaporator E consists simply of a reversely bent substantially horizontal conduit connected at its opposite ends to the substantially horizontal gas heat exchanger G by conduits 24 and 27a.

Since the gas heat exchanger in this form of the invention is horizontal as well as the evaporator the drain 25 of the evaporator of Figure 1 may be omitted. A conduit 41 is provided which connects between the gas heat exchanger and the lower portion of the absorber, or the strong solution conduit 21, through a liquid sealing trap, see Fig. 2, to drain the gas heat exchanger and the evaporator.

It will be noted that the gas lift pump element 17 in this form of the invention is illustrated as of the twin lift type. This is provided for purposes of efficiency but does not alter the essential functioning of the apparatus.

The condenser C is positioned below the evaporator, therefore, discharge conduit 12 of the condenser is connected to the lower liquid receiving portion of a twin gas lift pump 42 which discharges into a gas and liquid separation chamber 43 in the gas inlet side of the evaporator conduit E. Pumping gas is supplied to the gas lift pump 42 by conduit 44 which receives pumping gas from the gas discharge conduit 23 of the gas propulsion element F.

In this form of the invention the primary refrigerating effect produced by evaporation of refrigerant into the inert gas in the evaporator E is not utilized at the point of production but is transferred to the point of utilization by a secondary system now to be described.

In Figure 4 the evaporator conduit E forms the inner passageway of a dual conduit heat exchange element having an outer passageway forming conduit 45. The outer passageway defined by the space between the conduits E and 45 forms the flow passageway for the secondary cooling medium. Chilled cooling medium discharges from the conduit 45 through a conduit 47 which connects to the lower header 48 of a chilling unit. The cooling medium is distributed by header 48 to a plurality of conduits 49 which terminate in an upper header 50. The conduits 49 and headers 48 and 50 may be arranged in any desired configuration but as illustrated they are shown as surrounding and in heat transfer relationship with an ice tray or frozen food receiving housing 51. After traversing the cooling unit structures the secondary cooling medium is conducted by a conduit 53 to the inlet of a circulating pump 54. The circulating pump 54 then discharges the cooling medium to the conduit 45 through a conduit 55.

The secondary cooling system may be charged with any desired type of cooling medium such as brine, an aqua ammonia solution or a noncongealable oil.

In the operation of the refrigerating system the cooling medium flows in counter-flow relationship with the inert gas and liquid refrigerant flowing through the evaporator conduit E wherefore optimum heat transfer conditions prevail.

Figure 5:
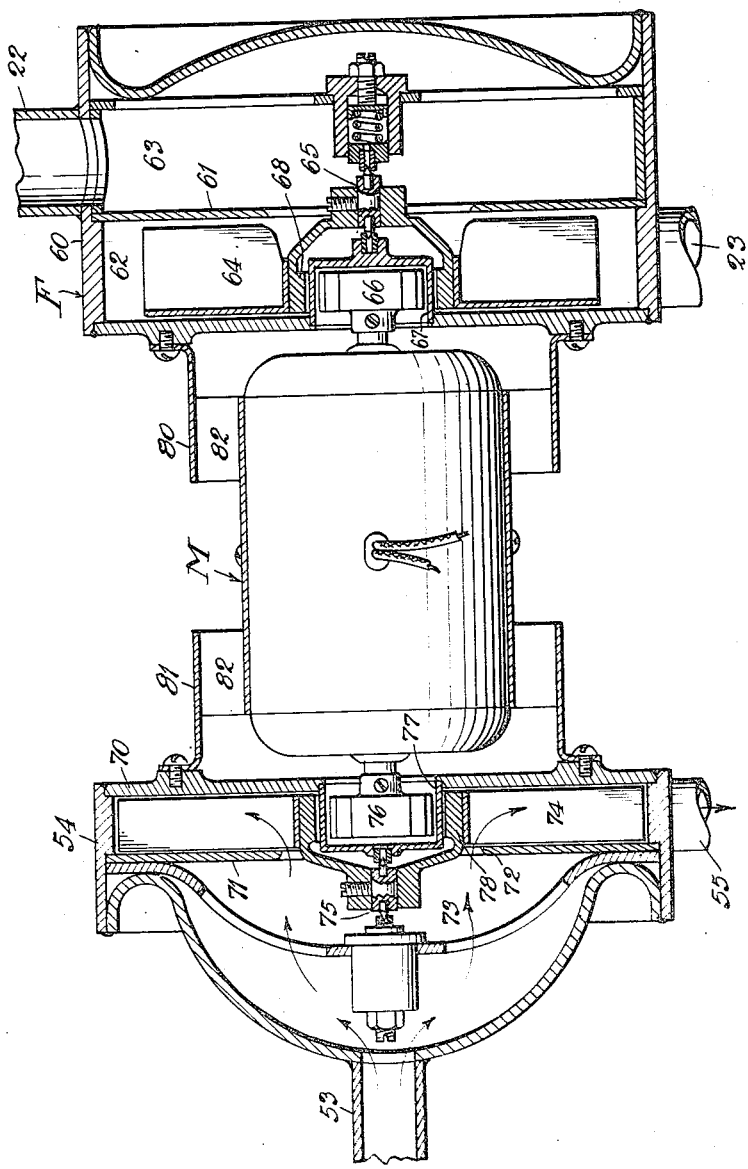
Figure 5 is a detailed sectional view of a combined inert gas pump and secondary refrigerant pump both operated by a single electrical motor.

The structures of the pumping mechanism for the inert gas and secondary cooling medium are illustrated in Figure 5. The inert gas circulating element comprises a casing 60 divided by a partition 61 into a pump chamber 62 and a gas inlet chamber 63. A centrifugal fan 64 is mounted upon a bearing structure indicated generally at 65 for rotary motion within the chamber 62. A permanent driving magnet 66 mounted upon the shaft of the motor M rotates within an inset cup 67 in the housing 60 to drive a permanent driven magnet 68 attached to the rotary fan structure 64. This structure is described in detail in the aforesaid application of C. G. Puchy.

The secondary medium circulating pump 54 comprises a housing 70 divided by a partition 71 into a pump chamber 72 and communicating inlet chamber 73. A centrifugal liquid pump 74 is mounted for rotation in the chamber 72 upon a bearing structure 75. The centrifugal pump 74 is driven through a magnetic drive structure which comprises a permanent magnet 76 permanently attached to the shaft of the motor M which rotates within an inset cup 77 set into the housing structure 70. The fan structure has built thereinto a permanent follower magnet structure 78 which is caused to rotate by rotation of the drive magnet 76.

The motor M and its drive magnets 66 and 76 are secured in position between the fan structure F and the pump structure 54 by brackets 80 and 81 secured to the fan F and the chamber 54 respectively. Suitable blocks of rubber or other resilient material indicated generally at 82 are bonded to the bracket structures 80 and 81 and to the motor M to provide a firm resilient mounting for the motor and its associated drive magnets.

It is apparent from the above that energization of the motor will produce rotation of the drive magnets 66 and 76 which will in turn produce rotation of the fan 64 and centrifugal pump 74 respectively.

Figure 3:
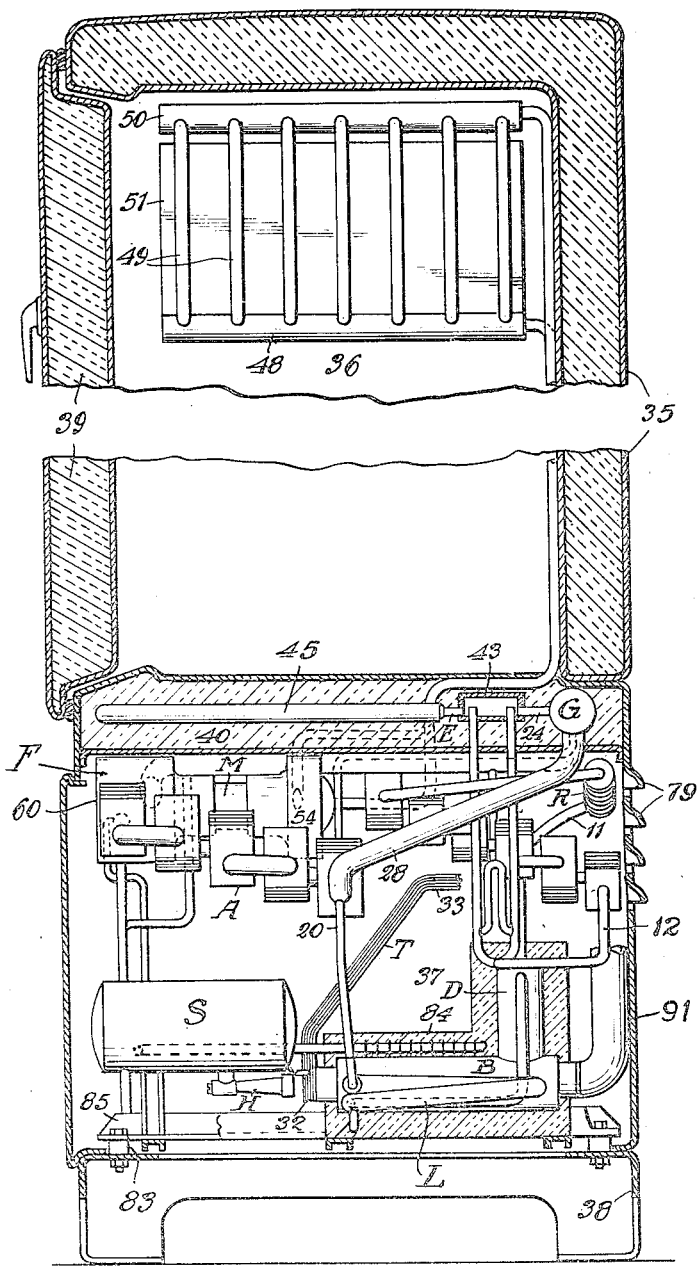
Figure 3 is a side sectional elevation of the apparatus illustrated in Figure 2.

The motor M is energized by a thermopile T, see Figure 3, positioned with its hot junctions 32 in the path of the flame emitted from burner H and with its cold junctions 33 positioned beneath the air cooled condenser C and adjacent the rear portion of chamber 37 which is provided with air outlet louvers 79.

The general arrangement of the parts in the chamber 37 is apparent from Figure 3 wherein it will be seen that the absorber is positioned in the upper forward portion of the chamber 37 and extends rearwardly and downwardly toward the upper central portion thereof. The condenser is positioned rearwardly of the absorber and extends from approximately the mid-central top portion of the chamber downwardly to the upper central rear wall of the compartment. The generator assembly comprising the generator, analyzer and liquid heat exchanger are encased in a block of insulating material 84 which is mounted in the lower rear corner of the chamber 37. The refrigerating mechanism is suitably secured to a supporting frame fragmentarily indicated at 85 which is secured to the base frame 38 of the cabinet structure by a shock absorbing securing element 83.

The gas heat exchanger G, evaporator E, separation chamber 43 and heat exchange conduit 45 are all positioned substantially horizontally within the insulation of the lower insulated wall 40 of the food storage compartment.

The conduits 47 and 53 extend through the upper surface of the wall 40 against the rear wall of the cabinet 35 and extend upwardly to their points of connection with the headers 48 and 50. The cooling unit structure may be supported by suitable brackets from either the top or rear wall of the cabinet 35 or, if desired, the conduits 53 and 47 may be constructed of material having sufficient inherent mechanical strength to support the cooling unit structure.

The above arrangement provides for substantially unobstructed flow of cooling air through the bottom of the open chamber 37 across the air cooled heat rejecting portions of the apparatus and the cold junctions 33 and out through the louvers 79 positioned at the rear of the cabinet structure. Since the gas heat exchanger and evaporating elements are embedded in the insulation of the bottom wall of the food storage compartment these elements are effectively shielded from heat rejected by the condenser, absorber, rectifier and generator assembly while being protected from heat loss to air contact therewith.

Though a conventional arrangement of cooling unit in the food storage compartment has been illustrated it is within the scope of the invention to provide many different arrangements of cooling element within or adjacent to the food storage compartment. For example, the headers 48 and 50 may be positioned in substantially the same plane connected by one or more fluid passageways underlying or overlying a shelf upon which frozen foods or freezing receptacles may be placed. If desired the secondary circuit may be split to provide two or more chilling units positioned in selected portions of the interior of the insulated cabinet structure to form, for example, an ice freezing element and one or more air cooling elements for refrigerating the higher temperature food preserving section of the cabinet structure.

Since the cabinet structure per se is substantially independent of the primary refrigerating system that system may be designed to give optimum results within the space limitation provided by the space beneath the food storage compartment without regard to the arrangement of chilling elements within the food storage compartment which are entirely a part of the secondary system.

With the presently described arrangement the sole source of energy to the system may be in the form of heat as applied by a gas flame, kerosene burner or the like while fluid circulation in both systems is achieved in a highly efficient manner by electrically operated means which derive their energy from a thermopile heated by the principal source of heat for the apparatus. It is within the scope of the invention, however, to vary the arrangement of the thermo-electric generator. For example, the hot junctions may be heated by waste products of combustion in the exhaust flue 91 or by the heat rejected from the absorber, condenser or other hot element. Also the cold junctions may be cooled by the primary or secondary cooling units to increase the supply of electrical energy.

Though the invention has been described in connection with a three-fluid type absorption refrigerating system it may be applied to other types of heat operated refrigerating systems or systems having a high temperature heat rejecting part. The energy derived from the thermo-electric generator may be utilized for a variety of purposes such as energizing a cabinet light or an air circulator in the cabinet or cooling air flow path. The term associated auxiliary as used herein and in the appended claims is intended to cover any electrically operated part of or adjunct to the refrigerator such as a cabinet light, an air circulator or the like which is energized by a thermo-electric generator heated with or by the refrigerating system.

I claim:

1. A heat operated refrigerating system having a heated part, means for heating said heated part, a secondary refrigerating system comprising a heat absorbing part and a heat rejecting part arranged to be cooled by said heat operated refrigerating system, a pump for circulating a secondary coolant through said secondary system, an electric motor for operating said pump and a thermo-electric generator connected to supply energy to said motor and positioned to be heated by heat derived from said heating means.

2. In a device of the character described a heat operated refrigerating system; a heat transfer system having a heat rejecting part arranged to be cooled by said heat operated refrigerating system, a heat absorbing part and an electrically operated fluid circulator; means for applying heat to said heat operated refrigerating system; and a thermo-electric generator arranged to be activated by heat applied to said heat operated refrigerating system and connected to energize said electrically operated part.

3. Refrigerating apparatus comprising an absorption refrigerating system of the inert gas type including an evaporator and an inert gas circulator; a heat transfer system including a cooling unit, a cooled part in heat exchange relationship with said evaporator, and a fluid circulator; means for heating said absorption refrigerating system, an electric motor arranged to operate said circulators, and a thermo-electric generator arranged to be heated by said heating means and connected to energize said motor.

4. Refrigerating apparatus including a heat operated refrigerating system of the pressure equalized type including an evaporator, a fluid circuit, fluid circulating means in said fluid circuit, electro-magnetic means for operating said fluid circulating means, a thermo-electric generator arranged to be heated by heat derived from said refrigerating system and connected to energize said electro-magnetic means.

5. Refrigerating apparatus comprising an absorption refrigerating system having an evaporator and an absorber connected to form an inert gas circuit, a boiler assembly and said absorber connected to form an absorbing solution circuit, a condenser connected to receive refrigerant vapor from said boiler assembly and to supply refrigerant liquid to said evaporator, a fluid circulator in said inert gas circuit for placing inert gas under pressure, a gas lift circulator in said solution circuit and means for supplying pumping gas under pressure from said inert gas circuit to said gas lift circulator; a heat transfer system having a heat rejecting part in thermal transfer relationship with said evaporator, a cooling unit and a fluid circulator connected to produce circulation of a heat transfer medium between said cooling unit and said heat rejecting part; an electro-magnetic means arranged to operate each of said fluid circulators, and a heat energized electric generator connected to energize said electro-magnetic means.

6. In a refrigerator, a cabinet structure having an insulated refrigerating chamber and a mechanism chamber, a heat operated refrigerating system including an evaporator and a fluid circulator in said cabinet structure outside said refrigerating chamber; a heat transfer system having a cooling unit in said refrigerating chamber, an element arranged to be cooled by said evaporator and a fluid circulator connected to circulate a cooling medium between said cooling unit and said element; and a motive device arranged to operate both of said circulators, a heating means for said heat operated refrigerating system, and a thermo-electric generator positioned to be heated by said heating means and connected to energize said motive device.

7. In a refrigerator, a cabinet structure having an insulated refrigerating chamber and a mechanism chamber; a heat operated refrigerating system associated with said cabinet structure and including a heated part, a heat rejecting part positioned in said mechanism chamber, and a fluid circulator positioned in said mechanism chamber; a heater for said heated part, an electrically energized device for operating said fluid circulator, said cabinet structure being constructed and arranged to provide a path of flow of cooling air over said heat rejecting part, and a thermopile connected to energize said electrically energized device, said thermopile having a hot junction arranged to be heated by said heating means and a cold junction arranged to be cooled by air flowing in said path of flow.

8. A refrigerator including an insulated cooling compartment and a mechanism compartment; a refrigerating system having a cooling element extending into the insulation of a wall of said cooling compartment, a heated part and an electrically energized fluid circulator in said mechanism compartment; a secondary cooling system having a cooling unit arranged to refrigerate said compartment, a part arranged to be cooled by said cooling element, an electrically energized fluid circulator and means connecting said cooling unit, said part and said fluid circulator for circulation of a heat transfer medium; means for heating said heated part, and a thermo-electric generator arranged to be heated by said heating means and to energize said electrically energized circulators.

9. In a refrigerator, a cabinet structure having a cooling chamber and a mechanism chamber arranged for circulation of cooling air therethrough, refrigerating apparatus associated with said cabinet structure including a heated part, means for heating said heated part, a heat rejecting element in said mechanism chamber arranged to be cooled by air flowing therethrough, an electrically energized part, a thermopile connected to energize said electrically energized part having a hot junction positioned to be heated by said heating means and a cold junction positioned to be cooled by air flowing through said mechanism chamber.

10. A refrigerator comprising; a heat operated refrigerating system including a fluid circulator hermetically sealed within the system, a heat transfer system having a heat rejecting part arranged to be cooled by said refrigerating system, a heat absorbing part and a fluid circulator hermetically sealed within the system; means for heating said refrigerating system, an electric motor including magnetic drive means arranged to drive said hermetically sealed circulators magnetically and a thermoelectric generator arranged to be heated by heat derived from said heating means and connected to energize said motor.

11. In a refrigerator, a cabinet structure having a cooling chamber and a mechanism compartment arranged for flow of cooling air therethrough, a refrigerating apparatus associated with said cabinet structure having a heat rejecting part arranged to reject heat to cooling air flowing through said compartment and a heated part, an electrically energized auxiliary associated with said cabinet structure, a thermoelectric generator arranged to energize said auxiliary having a part to be heated and a part to be cooled arranged to be cooled by cooling air flowing through said compartment, and means for heating said heated parts.

12. In a refrigerator, a cabinet structure having a cooling chamber and a mechanism compartment arranged for flow of cooling air therethrough; a refrigerating apparatus associated with said cabinet structure including a heat rejecting part arranged to be cooled by air flowing through said compartment, a heated part, a cooling part arranged to refrigerate said chamber, and an electrically energized part; a thermoelectric generator connected to activate said electrically energized part and including a heated part and a cooled part arranged to be cooled by air flowing through said compartment, and means for heating said heated parts.

OTIS B. SUTTON.

REFERENCES CITED

The following references are of record in the file of this patent:

UNITED STATES PATENTS

| Number | Name | Date |
|---|---|---|
| 244,666 | Randall | July 19, 1881 |
| 1,118,269 | Creveling | Nov. 24, 1914 |
| 1,642,015 | Cramer | Sept. 13, 1927 |
| 2,119,494 | Smith | May 3, 1938 |
| 2,323,212 | Fenander | June 29, 1943 |
| 2,387,657 | Gross | Oct. 23, 1945 |